United States Patent [19]
Rodriguez

[11] Patent Number: 5,125,540
[45] Date of Patent: Jun. 30, 1992

[54] MEASURING DEVICE AND FLUID DISPENSER

[75] Inventor: Hugo Rodriguez, El Vigia, Venezuela

[73] Assignee: Maraven, S.A., Venezuela

[21] Appl. No.: 724,911

[22] Filed: Jul. 2, 1991

[51] Int. Cl.⁵ .............................................. B07D 5/32
[52] U.S. Cl. ................................. 222/153; 222/447; 222/449; 222/450; 222/477
[58] Field of Search ............... 222/129, 130, 153, 158, 222/185, 154, 394, 425, 441, 442, 445–451, 460, 476, 477; 141/18, 29

[56] References Cited

U.S. PATENT DOCUMENTS

| | | | |
|---|---|---|---|
| 276,690 | 5/1883 | Hazard | 222/449 |
| 432,995 | 7/1890 | Filson | 222/185 |
| 534,082 | 2/1895 | Reeder | 222/449 |
| 1,053,316 | 2/1913 | Psikal | 222/447 |
| 1,594,367 | 8/1926 | Heron | 222/450 |
| 1,724,751 | 8/1929 | Cushing | 222/447 |
| 1,939,939 | 12/1933 | Worrell | 222/447 |
| 4,746,036 | 5/1988 | Messner | 222/153 |

Primary Examiner—Kevin P. Shaver
Assistant Examiner—Philippe Dergkshani
Attorney, Agent, or Firm—Bachman & LaPointe

[57] ABSTRACT

The present invention is drawn to a container for dispensing fluids in metered amounts and, more particularly, a container for dispensing motor oil for lubricating the engine of a vehicle. The container comprises a housing defining space within which a wall is mounted for dividing the space into first and second compartments. A valve actuator stem is mounted in the first compartments and is selectively moveable from a first position through a second position to a third position and back again for selectively operating a fluid inlet valve and gas inlet and outlet valves. A second actuator is associated with the second compartment defined within the space of the housing. The second valve actuator is moveable between a first and a second position for opening and closing a fluid outlet valve. A linkage is provided for interconnecting the valve actuators.

4 Claims, 6 Drawing Sheets

MEASURING DEVICE AND FLUID DISPENSER

BACKGROUND OF THE INVENTION

The present invention is drawn to a container for dispensing fluids in metered amounts and, more particularly, a container for dispensing motor oil for lubricating the engine of a vehicle.

Typically, motor oil is packaged in individual metal containers. When dispensing the motor oil the metal container is punctured and the motor oil is then poured into the motor from the container. The numerous metal containers resulting from the dispensing of motor oil in the foregoing manner results in a significant waste disposal problem. In addition, there is often a waste of motor oil from spillage when trying to dispense the oil from the metal can.

Naturally, it would be highly desirable to provide a container for dispensing fluids which is reusable and capable of receiving fluids from a central location and dispensing the fluids in a rapid and sure manner.

Accordingly, it is a principal object of the present invention to provide a container for dispensing liquid fluids in a rapid and sure manner.

It is a particular object of the present invention to provide a container as aforesaid for dispensing motor oil.

It is a still further object of the present invention to provide a container as aforesaid which is capable of dispensing motor oil in metered amounts.

It is a further object of the present invention to provide a container as aforesaid which is reusable and fillable from a central source.

Further objects and advantages of the present invention will appear hereinbelow.

SUMMARY OF THE INVENTION

The present invention is drawn to a container for dispensing fluids in metered amounts and, more particularly, a container which is reusable for dispensing motor oil to the engine of a motor vehicle.

In accordance with the present invention the container comprises a housing defining space within which a wall is mounted for dividing the space into first and second compartments. A valve actuator stem is mounted in the first compartment and is selectively moveable from a first position through a second position to a third position and back again for selectively operating a fluid inlet valve and gas inlet and outlet valves. A second actuator is associated with the second compartment defined within the space of the housing. The second valve actuator is moveable between a first and a second position for opening and closing a fluid outlet valve. A linkage is provided for interconnecting the valve actuators. In accordance with the present invention, the first valve actuator is selectively moveable from (1) a position wherein the fluid inlet valve is opened and the gas outlet valve is open for feeding fluid to the second compartment of the housing (2) through an intermediate position where the fluid inlet valve and the gas inlet and outlet valves are closed while the linkage between the first actuator and the second actuator insures that the fluid outlet valve is closed (3) to a third position where the fluid outlet valve is opened by the linkage and the gas inlet valve is opened by the first actuator. By providing the intermediate position wherein all of the valves are closed, the fluid is fed and discharged from the container in a non-turbulent manner.

The container of the present invention allows for the dispensing of fluids in an economic, rapid and sure manner.

DETAILED DESCRIPTION

Figure 1:
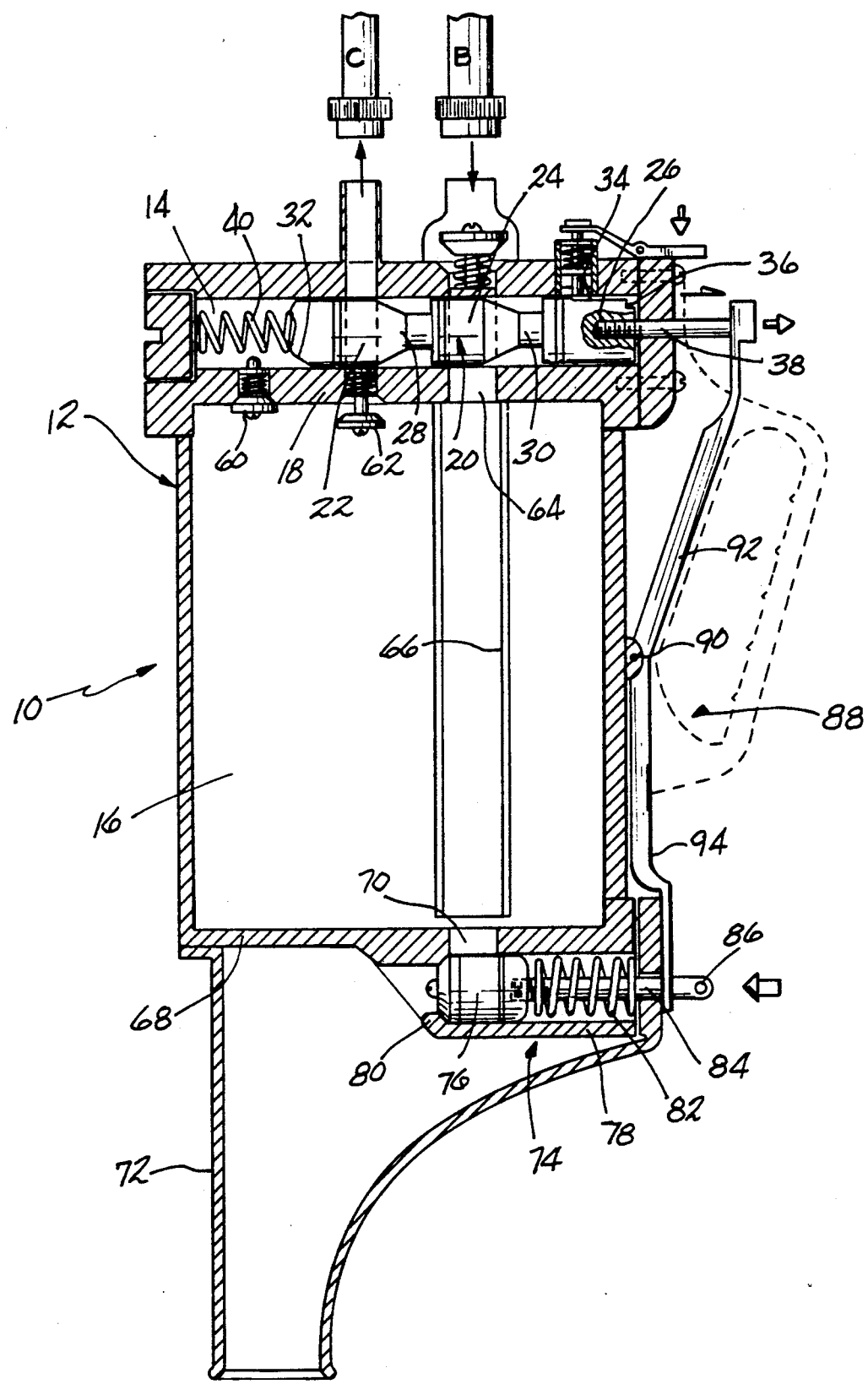
FIG. 1 is a partial cross sectional view of a first embodiment of a container in accordance with the present invention illustrating the valve actuator in its third operative position.
Figure 2:
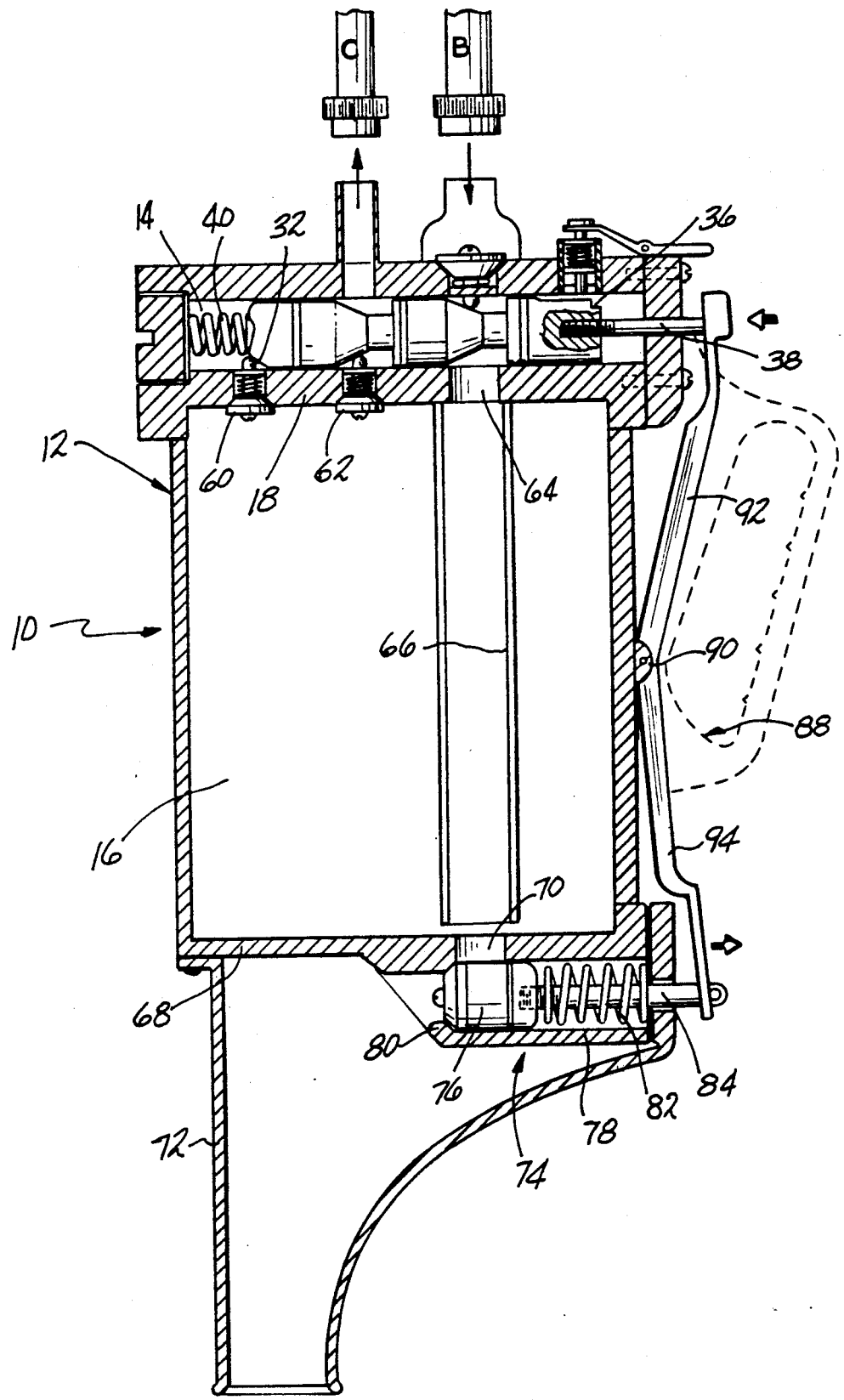
FIG. 2 is a partial cross sectional view of a first embodiment of a container in accordance with the present invention illustrating the valve actuator in its second operative position.
Figure 3:
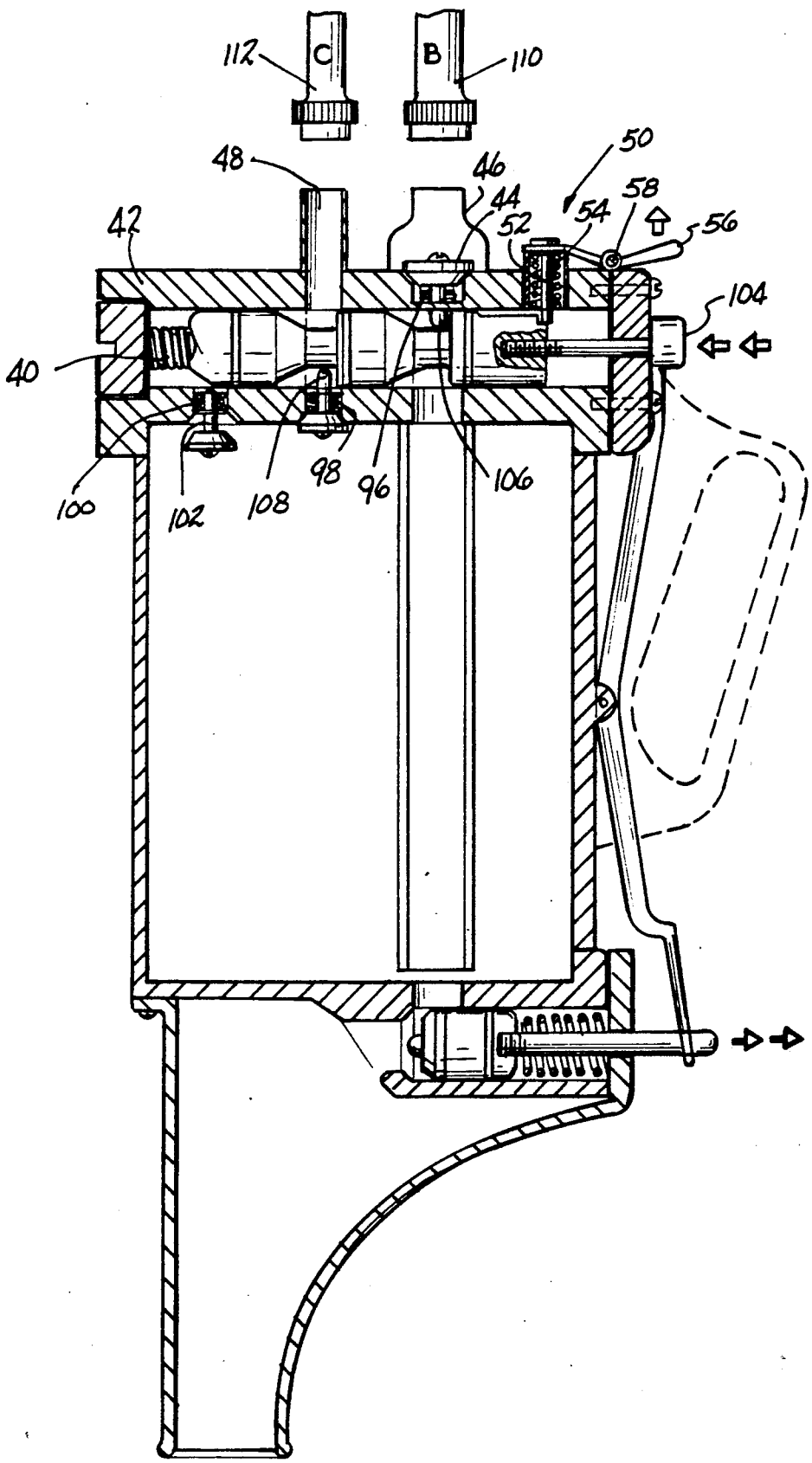
FIG. 3 is a partial cross sectional view of a first embodiment of a container in accordance with the present invention illustrating the valve actuator in its first operative position.

FIGS. 1 through 3 illustrate a first embodiment of a container for dispensing fluids in accordance with the present invention.

With reference to FIGS. 1 and 3, a container 10 for dispensing fluids comprises a transparent housing 12 defining a space which is divided into a first compartment 14 and a second compartment 16 by way of a wall 18. Mounted within the first compartment 14 is a first valve actuator 20 which comprises a spool having lands 22, 24 and 26 interconnected by grooves 28 and 30 respectively. Land 22 is provided with a chamfer portion 32 and land 26 is provided with a groove 34 and recess 36 for reasons to be made clear hereinbelow. A rod 38 is threadedly connected to land 26. A spring 40 biases against land 22 for biasing first valve actuator 20 to its third operative position.

Mounted in the upper wall 42 of housing 12 is a fluid inlet valve 44 which communicates with fluid inlet 46. Also mounted in wall 42 is a gas outlet line 48. In addition, mounted in wall 42 of housing 12 is a detent mechanism 50 which, as can best be seen in FIG. 3, holds the valve actuator 20 in its first operative position against the biasing force of spring 40. The detent mechanism 50 comprises a stem 52 which is held by spring 54 in recess 36 when the first valve actuator 20 is moved to its first position by application of force to rod 38 in a manner to be described hereinbelow. Connected to stem 52 is lever 56 which is pivotably mounted about point 58. As can be seen in FIG. 1, by pressing down on the lever 56, the lever is pivoted about point 58 thereby pulling stem 52 upwards and releasing same from recess 36 which allows for the spring 40 to bias the first valve actuator 20 to its third operative position.

Mounted in wall 18 and spring held in their closed positions are gas inlet valve 60 and gas outlet valve 62.

Also mounted in wall 18 is a fluid inlet port 64 which communicates fluid inlet 46 with pipe 66 when fluid inlet valve 44 is in its open position. Pipe 66 extends through the second compartment and terminates adjacent bottom wall 68 so as to allow for the fluid introduced through inlet 46 to be fed to the bottom of compartment 16.

Wall 68 is provided with an outlet port 70 for removing fluid from the second compartment 16 into a feeding trough 72 for feeding the fluid to, for example, the engine of a motor vehicle. Outlet port 70 is selectively opened and closed by means of a second valve actuator 74. The second valve actuator 74 comprises a land 76 slidably received within a housing 78 having a stop 80. A spring 82 normally biases land 76 against stop 80 for closing off outlet port 70. Threadably connected to land 76 is a stem portion 84 which projects out of housing 78. A stop pin 86 is provided on the stem portion 84 for reasons to be made clear hereinbelow.

A linkage assembly 88 interconnects the rod 38 and stem portion 84 of the first and second valve actuators 20 and 74. The linkage comprises a lever pivotably mounted on the housing about point 90 and provided with two arms 92 and 94 respectively extending therefrom. Arm 92 is fixedly connected to rod 38 of valve actuator 20 while arm 94 is slidably mounted on stem portion 84 of valve actuator 74.

With reference to FIGS. 1 through 3, the operation for filling and dispensing fluids from the container 10 will be described in detail.

FIG. 3 illustrates the first valve actuator in what will be referred to as its first operative position. In the first operative position first valve actuator 20 is held in place by the detent mechanism 50 wherein stem 52 is held by spring 54 in recess 36. In this position fluid inlet valve 44 and gas outlet valve 62 are held in their closed position by means of compressive forces exerted by springs 96 and 98. Gas inlet valve 60 is biased by chamfer 32 and land 22 to its open position against the compressive force of spring 100 by means of pin 102. With valve actuator 20 in its first position the lever mechanism 88 is pivoted about point 90 in a counterclockwise direction until button 104 on arm 92 abuts the housing 12. In this position, arm 94 has likewise been rotated in a counterclockwise direction so as to abut stop pin 86 and carry stem portion 84 and land 76 against the force of spring 82 so as to open outlet port 70. In this first position of valve actuator 20 the fluid is discharged from compartment 16 through outlet port 70 while at the same time air is allowed to enter the compartment 16 via gas inlet valve 60. Once all of the oil is drained from the second compartment 16 into, for example, the engine of a motor vehicle, lever 56 is pressed downwards thereby releasing stem 52 from recess 36, thereby allowing the valve actuator 20 to be biased by spring 40 to the right to its third operative position as shown in FIG. 1.

The biasing of the first valve actuator 20 to its third operative position as shown in FIG. 1 pivots lever mechanism 88 in a clockwise direction which results in arm 94 sliding down stem portion 84 away from abutment pin 86 with the result that spring 82 biases land 76 against stop 80 of housing 78 so as to close off fluid outlet port 70. At the same time, lands 22 and 24 act against pins 106 and 108 of valves 44 and 62 respectively so as to bias these valves to their open position against the compressive forces of springs 96 and 98. In addition, gas inlet valve 60 is moved to its closed position by compressive spring 100. In this position, the third operative position, the container is now ready to be filled with fluid from a source B. In addition, if desired, gas outlet 48 may be connected to a low pressure source 112. As fluid is fed from source 110 through fluid inlet 46, fluid inlet port 64 and pipe 66, fluid is delivered into the bottom of the compartment and gas collected over the fluid is removed via gas outlet valve 62 and outlet 48.

When the second compartment 16 is filled with fluid, as can be seen through the transparent housing 10, button 104 is pressed so as to bias valve actuator 20 from its third position to a intermediate second position illustrated in FIG. 2. As the valve actuator 20 assumes its second position as illustrated in FIG. 2, pins 106 and 108 are received within the grooves 30 and 28 respectively, so as to allow valves 44 and 62 to be moved to their closed position via springs 96 and 98. In this intermediate position, chamfer 32 on land 22 is proximate to pin 102 of gas inlet valve 60. In addition, in this second position the linkage mechanism 88 has been pivoted in a counterclockwise direction so as to bring arm 94 into proximity with stop pin 86. This intermediate position assures the fluid inlet valve 44 and the gas outlet valve 62 assume their closed position before outlet port 70 is uncovered by land 76. Upon further pressing of button 104 valve actuator 20 is biased to its extreme left position against spring 40 wherein stem 52 of detent mechanism 50 is forced into recess 36 by spring 54. At the same time, arm 94 carries the stem 84 and land 76 to the right by abutting pin 86 thereby moving the second valve actuator 74 to its open position so as to allow fluid to be drained from the second compartment 16. At the same time, chamfer 32 on land 22 engages pin 102 for biasing gas inlet valve 60 to its open position, thereby allowing the fluid to flow through outlets 70 in a non-turbulent manner.

Figure 4:
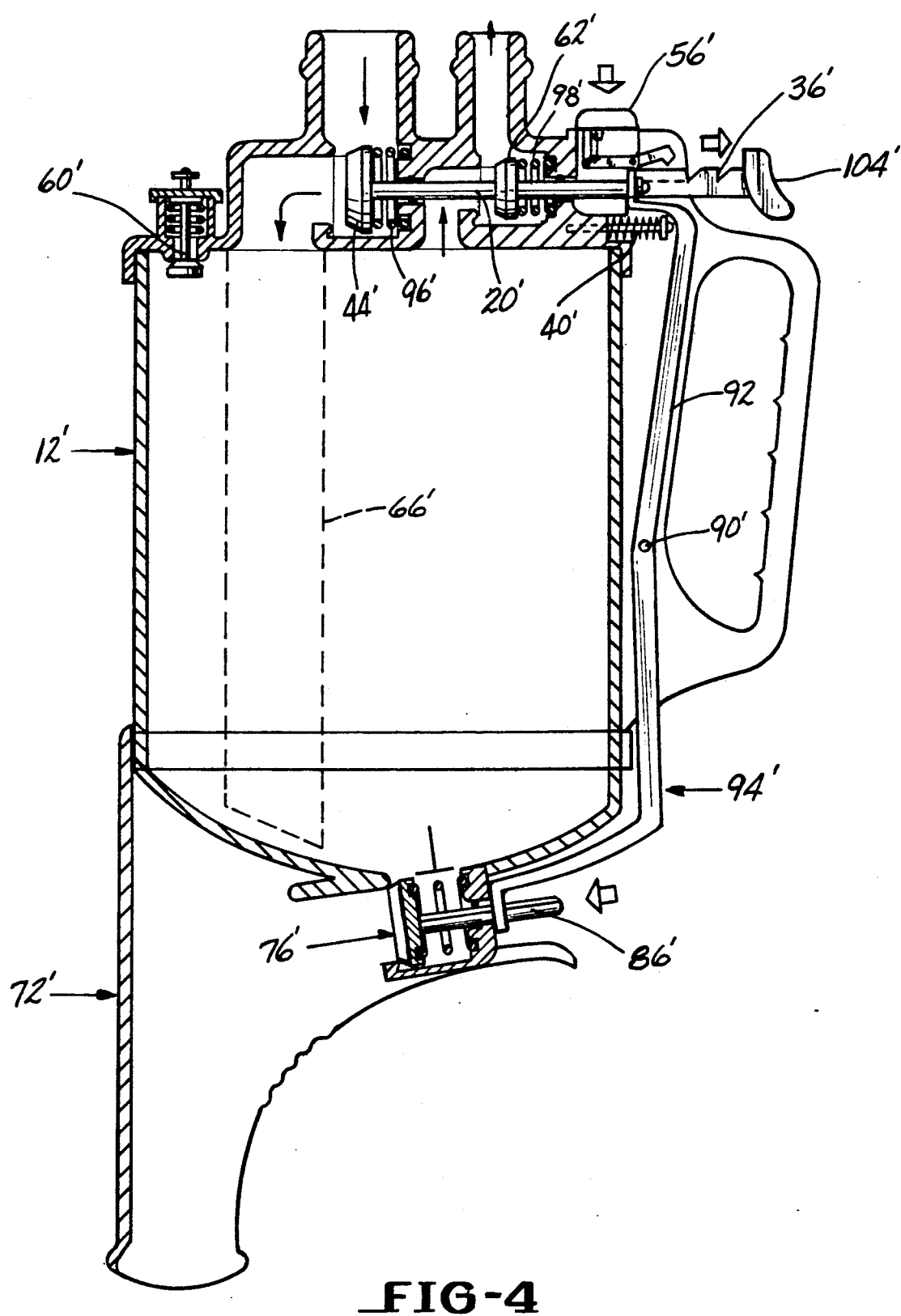
FIG. 4 is a partial cross sectional view of a second embodiment of a container in accordance with the present invention illustrating the valve actuator in its third operative position.
Figure 5:
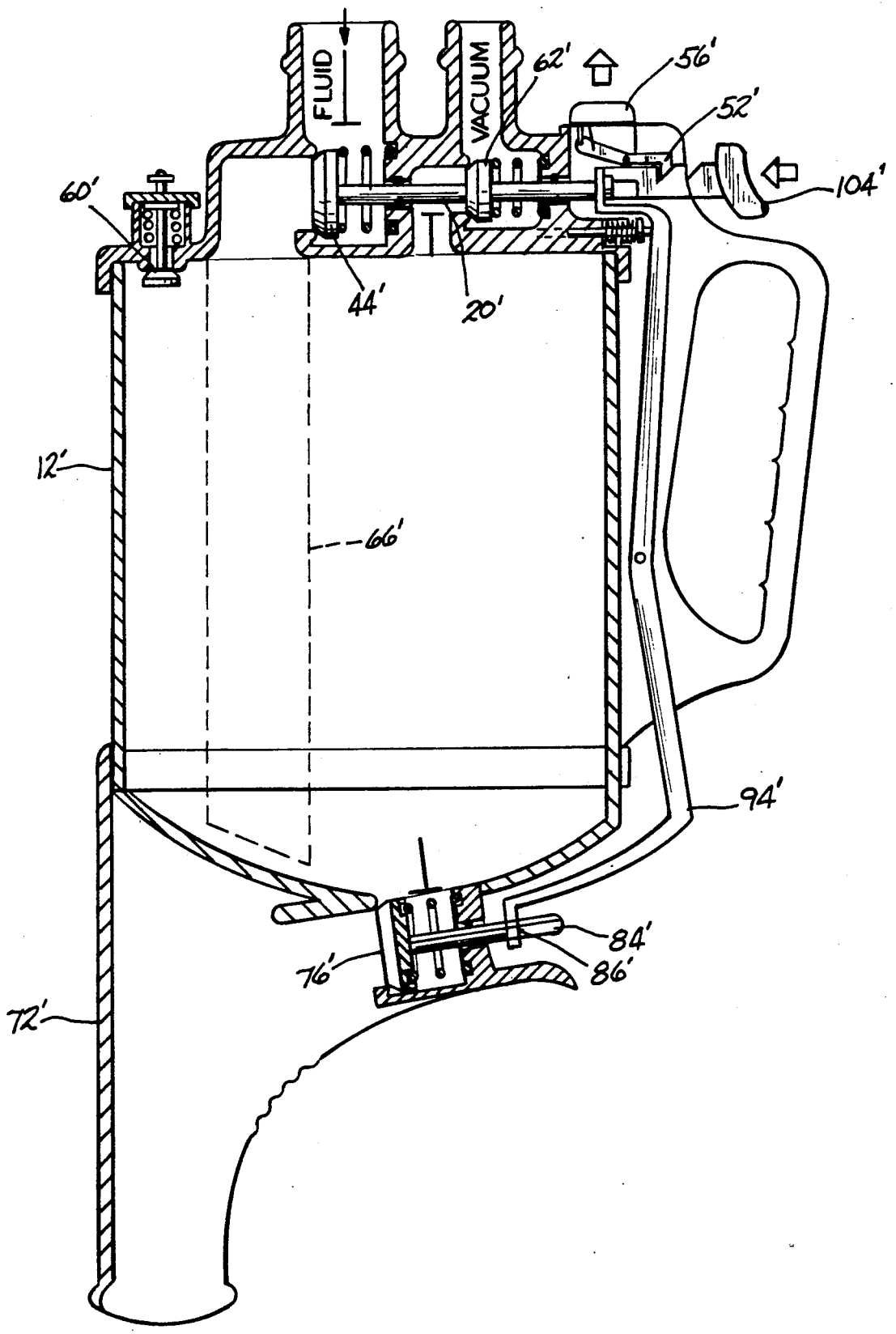
FIG. 5 is a partial cross sectional view of a second embodiment of a container in accordance with the present invention illustrating the valve actuator in its second operative position.
Figure 6:
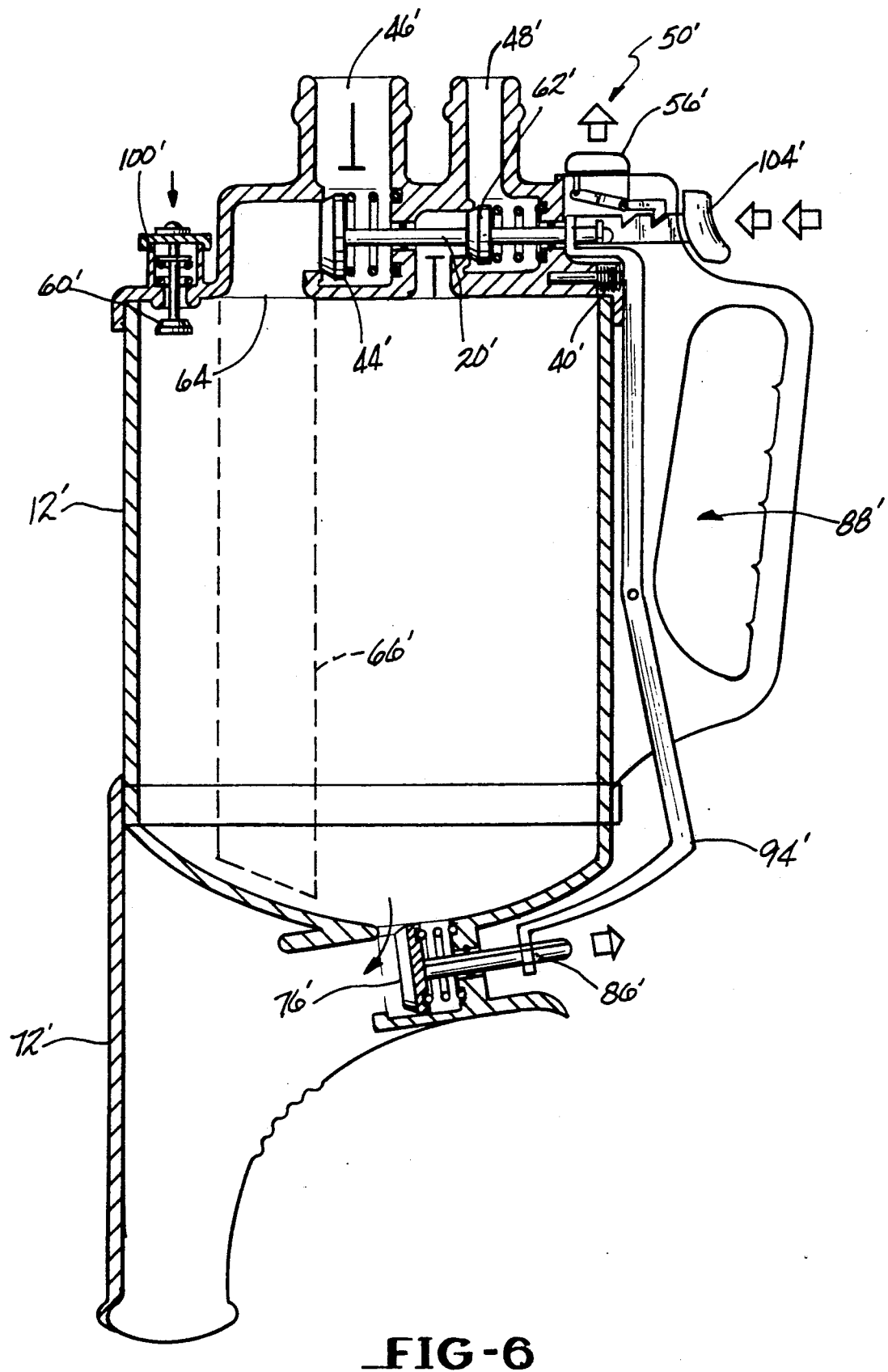
FIG. 6 is a partial cross sectional view of a second embodiment of a container in accordance with the present invention illustrating the valve actuator in its first operative position.

FIGS. 4 through 6 illustrate a second embodiment of a container for dispensing fluids in accordance with the present invention. For the sake of simplicity like elements in the embodiment of FIGS. 4 through 6 have been identified using the same reference numerals as their corresponding counterparts in the embodiment of FIGS. 1 through 3. The embodiment of FIG. 4 through 6 operates in the same manner as does the embodiment of FIGS. 1 through 3 in that FIG. 4 represents the third operative position of the first valve actuator 20', FIG. 5 represents the second position of valve actuator 20' and FIG. 6 represents the first operative position of valve actuator 20'.

FIG. 6 illustrates the first valve actuator in what will be referred to as its first operative position. In the first operative position first valve actuator 20' is held in place by the detent mechanism 50'. In this position fluid inlet valve 44' and gas outlet valve 62' are held in their closed position by means of compressive forces exerted by springs. Gas inlet valve 60' is biased manually to its open position against the force of spring 100'. With valve actuator 20' in its first position the lever mechanism 88' is pivoted about point 90' in a counterclockwise direction until button 104' on arm 92' abuts the housing 12'. In this position, arm 94' has likewise been rotated in a counterclockwise direction so as to abut stop pin 86' and carry stem portion 84' and land 76' against the force of spring 82' so as to open outlet port 70'. In this first position of valve actuator 20' the fluid is discharged from compartment 16' through outlet port 70' while at the same time air is allowed to enter the compartment 16' via gas inlet valve 60'. Once all of the oil is drained from the second compartment 16' into, for example, the engine of a motor vehicle, lever 56' is pressed downwards thereby releasing stem 52' from recess 36', thereby allowing the valve actuator 20' to be biased by spring 40' to the right to its third operative position as shown in FIG. 4.

The biasing of the first valve actuator 20' to its third operative position as shown in FIG. 4 pivots lever mechanism 88' in a clockwise direction which results in arm 94' sliding down stem portion 84' away from abutment pin 86' with the result that spring 82' biases land 76' against stop 80' of housing 78' so as to close off fluid outlet port 70'. At the same time valves 44' and 62' respectively are biased in their open position against the compressive forces of springs 96' and 98'. In addition, gas inlet valve 60' is moved to its closed position by compressive spring 100'. In this position, the third operative position, the container is now ready to be filled with fluid from a source B. In addition, if desired, gas outlet 48' may be connected to a low pressure source. As fluid is fed from a source through fluid inlet 46', fluid inlet port 64' and pipe 66', fluid is delivered into the bottom of the compartment and gas collected over the fluid is removed via gas outlet valve 62' and outlet 48'.

When the second compartment 16' is filled with fluid, as can be seen through the transparent housing, button 104' is pressed so as to bias valve actuator 20' from its third position to a intermediate second position illustrated in FIG. 5. As the valve actuator 20' assumes its second position as illustrated in FIG. 5, valves 44' and 60' are moved to their closed position via springs 96' and 98'. In this second position the linkage mechanism 88' has been pivoted in a counterclockwise direction so as to bring arm 94' into proximity with stop pin 86'. This intermediate position assures the fluid inlet valve 44' and the gas outlet valve 62' assume their closed position before outlet port 70' is uncovered by land 76'. Upon further pressing of button 104' valve actuator 20' is biased to its extreme left position against spring 40' wherein detent mechanism 50' is forced into recess 36'. At the same time, arm 94' carries the stem 84' and land 76' to the right by abutting pin 86' thereby moving the second valve actuator 74' to its open position so as to allow fluid to be drained from the second compartment 16'. At the same time, gas inlet valve 60' is biased manually to its open position, thereby allowing the fluid to flow through outlets 70' in a non-turbulent manner.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim.

1. A container for dispensing fluids in metered amounts comprising:

a housing defining a space;

wall means mounted within said space for dividing said space into a first compartment and a second compartment;

first valve actuator means mounted within said first compartment for selective movement from a first position through a second position to a third position and from said third position through said second position to said first position;

second valve actuator means associated with said second compartment and movable between a first and second position;

linkage means for interconnecting said first and second actuator means;

fluid inlet valve means, gas inlet valve means and gas outlet valve means associated with said first valve actuator means for feeding fluid and gas to said second compartment and removing gas from said second compartment in response to the position of said first valve actuator means;

fluid outlet valve means associated with said second valve actuator means for removing fluid from said second compartment in response to the position of said second valve actuator means;

detent means for (1) holding said first valve actuator means in its first position wherein said fluid inlet valve means and gas outlet valve means are closed and said gas inlet valve means is open and (2) holding said second valve actuator means in its first position wherein said fluid outlet valve means is open;

biasing means for (1) biasing said first valve actuator means from its first position to its third position and (2) said second valve actuator means from its first position to its second position upon release of said detent means wherein said fluid inlet valve means and gas outlet valve means are open and said gas inlet valve means and fluid outlet valve means are closed; and displacement means for moving said first valve actuator means from said third position through said second position to said first position wherein in its second position both of said fluid valve means and both of said gas valve means are closed.

2. A container according to claim 1 wherein said first valve actuator means comprises a spool having (1) first and second lands for opening said fluid inlet valve means and said gas outlet valve means when in said third position and (2) chamfer means opening said gas inlet valve means when in said first position.

3. A container according to claim 1 wherein said second valve actuator means comprises a stem connected to said fluid outlet valve means, said stem including abutment means wherein said linkage means abuts said abutment means for moving said fluid outlet valve means from said second position to said first position as said first valve actuator means moves from said second position to said first position.

4. A container according to claim 2 wherein said second valve actuator means comprises a stem connected to said fluid outlet valve means, said stem including abutment means wherein said linkage means abuts said abutment means for moving said fluid outlet valve means from said second position to said first position as said first valve actuator means moves from said second position to said first position.

* * * * *

UNITED STATES PATENT AND TRADEMARK OFFICE
CERTIFICATE OF CORRECTION

PATENT NO. : 5,125,540

DATED : June 30, 1992

INVENTOR(S) : HUGO RODRIGUEZ

It is certified that error appears in the above-identified patent and that said Letters Patent is hereby corrected as shown below:

In column 6, claim 4, line 5, change "va1ve" to read --valve--.

Signed and Sealed this

Eighth Day of February, 1994

Attest:

BRUCE LEHMAN

Attesting Officer

Commissioner of Patents and Trademarks